(12) United States Patent
Chen et al.

(10) Patent No.: US 9,599,767 B2
(45) Date of Patent: Mar. 21, 2017

(54) LIGHT EMITTING ASSEMBLY AND BACKLIGHT MODULE

(71) Applicant: Au Optronics Corporation, Hsinchu (TW)

(72) Inventors: Ching-Feng Chen, New Taipei (TW); Cheng-Min Tsai, Hsinchu (TW); Hua-Chen Fan, Taoyuan County (TW)

(73) Assignee: Au Optronics Corporation, Hsinchu (TW)

(*) Notice: Subject to any disclaimer, the term of this patent is extended or adjusted under 35 U.S.C. 154(b) by 0 days.

(21) Appl. No.: 14/925,981

(22) Filed: Oct. 29, 2015

(65) Prior Publication Data
US 2016/0047974 A1 Feb. 18, 2016

Related U.S. Application Data

(63) Continuation of application No. 13/167,753, filed on Jun. 24, 2011.

(30) Foreign Application Priority Data

Aug. 31, 2010 (TW) ............................... 99129267 A

(51) Int. Cl.
*G02F 1/1335* (2006.01)
*F21V 8/00* (2006.01)

(52) U.S. Cl.
CPC ............ *G02B 6/0083* (2013.01); *G02B 6/009* (2013.01); *G02B 6/0068* (2013.01); *G02B 6/0073* (2013.01); *G02F 1/133615* (2013.01)

(58) Field of Classification Search
None
See application file for complete search history.

(56) References Cited

U.S. PATENT DOCUMENTS

| | | | | |
|---|---|---|---|---|
| 6,521,879 B1* | 2/2003 | Rand | .................... | G09G 3/3406 250/205 |
| 8,360,599 B2* | 1/2013 | Ivey | ......................... | F21K 9/17 362/218 |
| 2006/0181878 A1* | 8/2006 | Burkholder | ........... | F21S 48/321 362/294 |
| 2007/0262948 A1* | 11/2007 | Han | ..................... | G09G 3/3406 345/102 |
| 2008/0094837 A1* | 4/2008 | Dobbins | ................... | F21K 9/00 362/249.01 |
| 2009/0046456 A1* | 2/2009 | Urano | ...................... | F21K 9/00 362/235 |
| 2009/0109368 A1* | 4/2009 | Watanabe | ............ | G02B 6/0083 349/58 |

* cited by examiner

*Primary Examiner* — Uyen Chau N Le
*Assistant Examiner* — Chris Chu
(74) *Attorney, Agent, or Firm* — Jianq Chyun IP Office

(57) ABSTRACT

A light emitting assembly, a backlight module having the light emitting assembly, and a liquid crystal display (LCD) apparatus having the backlight module are provided. The light emitting assembly includes a rigid circuit board, a plurality of light emitting diode (LED) devices, and a flexible circuit board. The rigid circuit board has a plurality of external circuits isolated from one another. The LED devices are disposed on the rigid circuit board, and each of the external circuits is connected to a corresponding one of the LED devices. The flexible circuit board has a plurality of connecting lines, and each of the connecting lines is connected to at least two of the external circuits, so as to serially connect the LED devices that are connected to the external circuits.

11 Claims, 8 Drawing Sheets

LIGHT EMITTING ASSEMBLY AND BACKLIGHT MODULE

CROSS-REFERENCE TO RELATED APPLICATION

This is a continuation application of and claims the priority benefit of patent application Ser. No. 13/167,753, filed on Jun. 24, 2011, now pending, which claims the priority benefit of Taiwan application serial no. 99129267, filed on Aug. 31, 2010. The entirety of each of the above-mentioned patent applications is hereby incorporated by reference herein and made a part of specification.

BACKGROUND OF THE INVENTION

Field of the Invention

The invention relates to a light emitting assembly, a backlight module, and a liquid crystal display (LCD) apparatus. More particularly, the invention relates to a light emitting assembly with reduced thickness, a backlight module having the light emitting assembly, and an LCD apparatus having the backlight module.

Description of Related Art

Energy conservation and new energy development are essential issues in the recent years, and light sources are now indispensable to human beings. Among the light sources, the energy-saving light emitting diode (LED) has become the focus of attention. This is not only because the LED is the main illumination source but also because the LED is power-saving, environment-friendly, long-lasting, and less pollutant.

In order to comply with requirements for energy conservation and environmental protection, the existing thin film transistor liquid crystal display (TFT-LCD) modules mostly employ the LED devices as the light sources. To be more specific, an LED device is formed on a circuit board to form an LED light bar that can be applied in a backlight module, and the LED light bar is combined with a light guide plate, so as to form a planar light source.

Generally, when the light bar having both a rigid circuit board and a flexible circuit board is to be formed, an LED device is fondled on the rigid circuit board, and then the rigid circuit board is combined with the flexible circuit board, so as to connect external circuits through the flexible circuit board. FIG. 1A is a schematic cross-sectional view illustrating a conventional backlight module. FIG. 1B illustrates the connecting relation of LED devices in the light bar depicted in FIG. 1A. With reference to FIG. 1A and FIG. 1B, in a backlight module 10, a holder 100 supports a light guide plate 102. A light bar 106 is located within the space 104 formed by the holder 100. Besides, the light bar 106 includes a rigid circuit board 108, three sets of serially connected LED devices 110, and a flexible circuit board 112. An end of each LED device 110 in each set is commonly connected to a positive electrode 114, and the other end of each LED device 110 in each set is respectively connected to negative electrodes 116a, 116b, and 116c.

The LED devices on the rigid circuit board are serially connected, i.e., the serially connected LED devices are adjacent to one another, which easily causes v-block defects. In other words, failure of an LED device of a serial of LED devices leads to malfunction of the whole serial of LED devices, which causes an abnormal display region (block) on a display frame because the LED devices in malfunction are adjacent to one another. The LED devices can thus be connected through jumpers in order to prevent the aforesaid defects. However, this leads to an increase in the area of the rigid circuit board.

FIG. 1C illustrates the connecting relation of the LED devices via the jumpers. Different from the light bar 106 in FIG. 1B, the light bar 106' in FIG. 1C has the first, the fourth, and the seventh LED devices 110 that are serially connected to form the first set of LED devices 110, the second, the fifth, and the eighth LED devices 110 that are serially connected to form the second set of LED devices 110, and the third, the sixth, and the ninth LED devices 110 that are serially connected to form the third set of LED devices 110. An end of each LED device 110 in each set is commonly connected to a positive electrode 114, and the other end of each LED device 110 in each set is respectively connected to negative electrodes 116a, 116b, and 116c.

It can be observed from FIG. 1B and FIG. 1C that the rigid circuit board is required to have a large area for circuit arrangement, such that the LED devices of the rigid circuit board can be connected via the jumpers. Thereby, the thickness h of the backlight module 10 is increased, and the LCD cannot be appropriately thinned down.

SUMMARY OF THE INVENTION

The invention is directed to a light emitting assembly in which LED devices and connecting lines are respectively disposed on a rigid circuit board and a flexible circuit board, so as to reduce the area of the rigid circuit board.

The invention is further directed to a backlight module in which a light emitting assembly has a rigid circuit board with the reduced area, so as to thin down the backlight module.

The invention is further directed to an LCD apparatus in which a backlight module has the reduced thickness, so as to comply with the requirement for thinning down the LCD apparatus.

The invention provides a light emitting assembly that includes a rigid circuit board, a plurality of LED devices, and a flexible circuit board. The rigid circuit board has a plurality of external circuits isolated from one another. The LED devices are disposed on the rigid circuit board, and each of the external circuits is connected to a corresponding one of the LED devices. The flexible circuit board has a plurality of connecting lines, and each of the connecting lines is connected to at least two of the external circuits, so as to serially connect the LED devices that are connected to the external circuits.

According to an embodiment of the invention, the rigid circuit board has a plurality of groups of contacts corresponding to the LED devices, for example. The groups of contacts are electrically connected to the connecting lines of the flexible circuit board, respectively. Each of the external circuits is connected to a corresponding one group of the contacts and a corresponding one of the LED devices.

According to an embodiment of the invention, the groups of contacts and the LED devices are located at the same side of the rigid circuit board, for instance, and the groups of contacts correspond to the LED devices and are arranged along a length direction of the rigid circuit board.

According to an embodiment of the invention, the groups of contacts and the LED devices are located at two respective sides of the rigid circuit board, for instance.

According to an embodiment of the invention, the light emitting assembly further includes a solder. The flexible circuit board, through the solder, is bonded onto the groups of contacts of the rigid circuit board, such that each of the connecting lines is electrically connected to a corresponding one of the external circuits.

The invention further provides a backlight module that includes a light guide plate, a holder, and a light emitting assembly. The holder supports the light guide plate and has a light source accommodation portion located at a side of the light guide plate. A light source accommodation space is within the light source accommodation portion. The light emitting assembly is disposed within the light source accommodation space. The light emitting assembly includes a rigid circuit board, a plurality of LED devices, and a flexible circuit board. The rigid circuit board has a plurality of external circuits isolated from one another. The LED devices are disposed on the rigid circuit board, and each of the external circuits is connected to a corresponding one of the LED devices. The flexible circuit board has a plurality of connecting lines, and each of the connecting lines is connected to at least two of the external circuits, so as to serially connect the LED devices that are connected to the external circuits.

According to an embodiment of the invention, the holder can include a bottom plate, a side wall, a top plate, a wall structure, and a pressing plate. The side wall is erected at a side of the bottom plate. The rigid circuit board is disposed on the side wall. The top plate is opposite to the bottom plate. Besides, the top plate is connected to a side of the side wall. The wall structure is opposite to the side wall, and the wall structure extends from the top plate to the bottom plate. The side wall, the top plate, the wall structure, and the bottom plate together constitute the light source accommodation portion. The pressing plate is opposite to the bottom plate and extends from the wall structure to a direction away from the side wall. The light guide plate is sandwiched between the pressing plate and the bottom plate.

According to an embodiment of the invention, the rigid circuit board has a plurality of groups of contacts corresponding to the LED devices. The groups of contacts are electrically connected to the connecting lines of the flexible circuit board, respectively. Each of the external circuits is connected to a corresponding one group of the contacts and a corresponding one of the LED devices.

According to an embodiment of the invention, the groups of contacts and the LED devices are located at the same side of the rigid circuit board, for instance, and the groups of contacts correspond to the LED devices and are arranged along a length direction of the rigid circuit board.

According to an embodiment of the invention, the flexible circuit board can include a plurality of bonding portions and a connecting portion. The bonding portions are respectively bonded onto the groups of contacts of the rigid circuit board. The connecting portion is arranged along a long side of the rigid circuit board, so as to connect the bonding portions. Besides, the connecting portion extends along the top plate toward a direction away from the side wall.

According to an embodiment of the invention, the light emitting assembly further includes a solder. The bonding portions, through the solder, are respectively bonded onto the groups of contacts of the rigid circuit board.

According to an embodiment of the invention, the groups of contacts and the LED devices are located at two respective sides of the rigid circuit board, for instance.

According to an embodiment of the invention, the flexible circuit board can include a bonding portion and a connecting portion. The bonding portion is bonded onto the groups of contacts of the rigid circuit board, and the connecting portion is located between the side wall and the rigid circuit board. The connecting portion is arranged along a long side of the rigid circuit board and connected to the bonding portion. Besides, the connecting portion extends along the top plate toward a direction away from the side wall.

According to an embodiment of the invention, the light emitting assembly further includes a solder. The bonding portion, through the solder, is bonded onto the groups of contacts of the rigid circuit board.

The invention further provides an LCD apparatus that includes a backlight module, a supporting frame, an LCD panel, and a control circuit board. The backlight module includes a light guide plate, a holder, and a light emitting assembly. The holder supports the light guide plate and has a light source accommodation portion located at a side of the light guide plate. A light source accommodation space is within the light source accommodation portion. The light emitting assembly is disposed within the light source accommodation space. The light emitting assembly includes a rigid circuit board, a plurality of LED devices, and a flexible circuit board. The rigid circuit board has a plurality of external circuits isolated from one another. The LED devices are disposed on the rigid circuit board, and each of the external circuits is connected to a corresponding one of the LED devices. The flexible circuit board has a plurality of connecting lines, and each of the connecting lines is connected to at least two of the external circuits, so as to serially connect the LED devices that are connected to the external circuits. The supporting frame is disposed on the holder. The LCD panel is disposed on the supporting frame. The control circuit board is disposed at a side of the backlight module and electrically connected to the LCD panel.

According to an embodiment of the invention, the flexible circuit board, for example, has a first joint element for connecting a second joint element on the control circuit board, such that the LED devices are electrically connected to the control circuit board.

Based on the above, in the invention, the LED devices are disposed on the rigid circuit board when the light emitting assembly is formed, and the connecting lines are disposed on the flexible circuit board. Thereby, it is not necessary to additionally arrange the connecting lines on the rigid circuit board, and thus the area of the rigid circuit board can be reduced. Moreover, in the backlight module having said light emitting assembly, the reduced area of the rigid circuit board results in the reduced thickness of the backlight module. Thanks to said backlight module with the reduced thickness, an LCD can also have the reduced thickness when the thin backlight module is applied to the LCD.

In order to make the aforementioned and other features and advantages of the disclosure comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
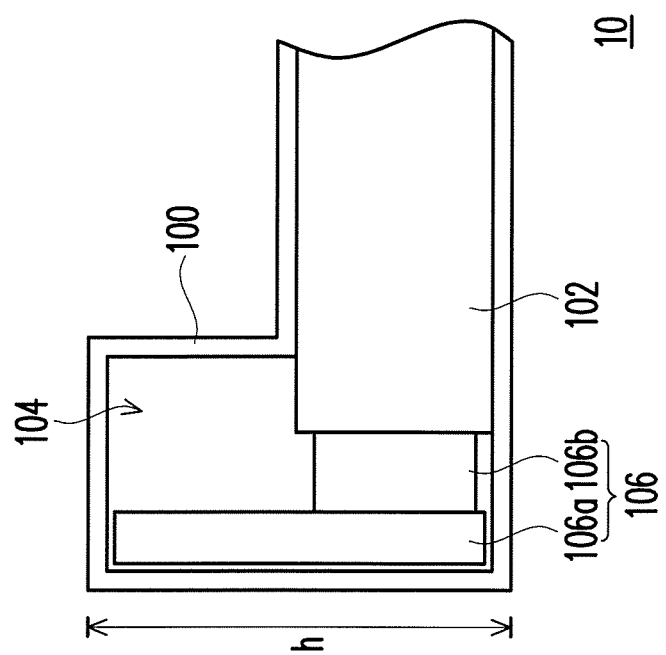
FIG. 1A is a schematic cross-sectional view illustrating a conventional backlight module.
Figure 1B:
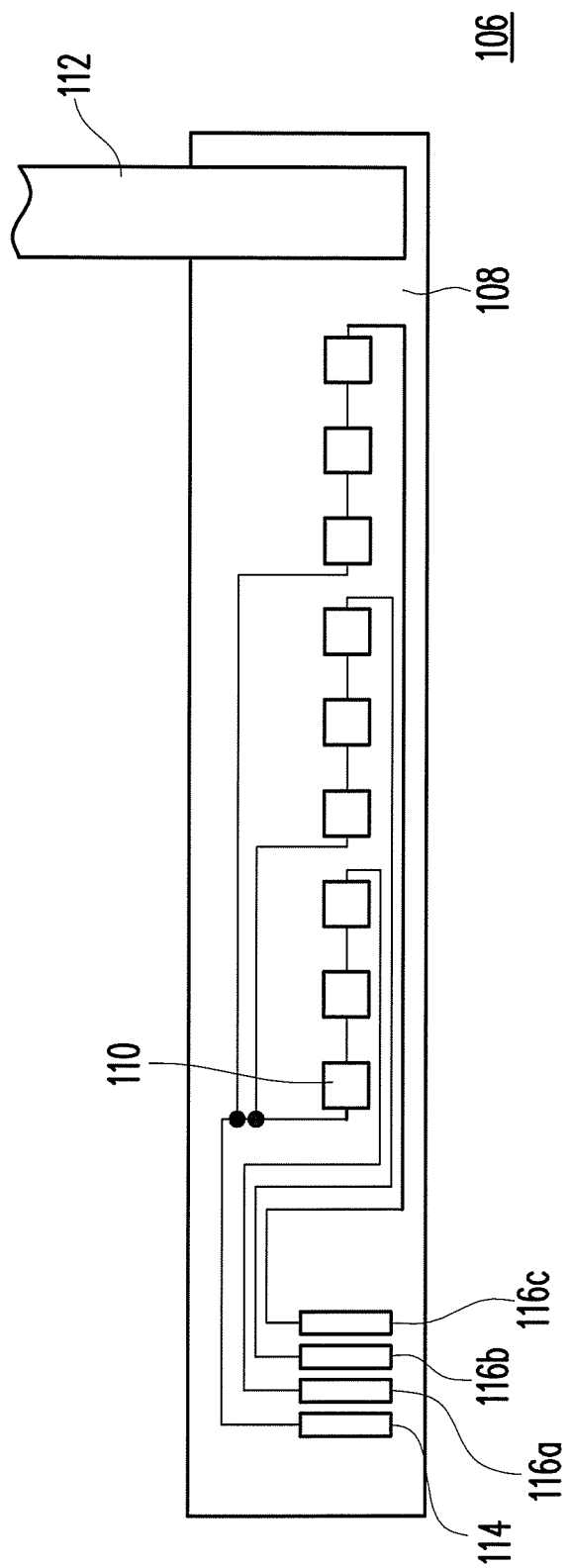
FIG. 1B illustrates the connecting relation of LED devices in the light bar depicted in FIG. 1A.
Figure 1C:
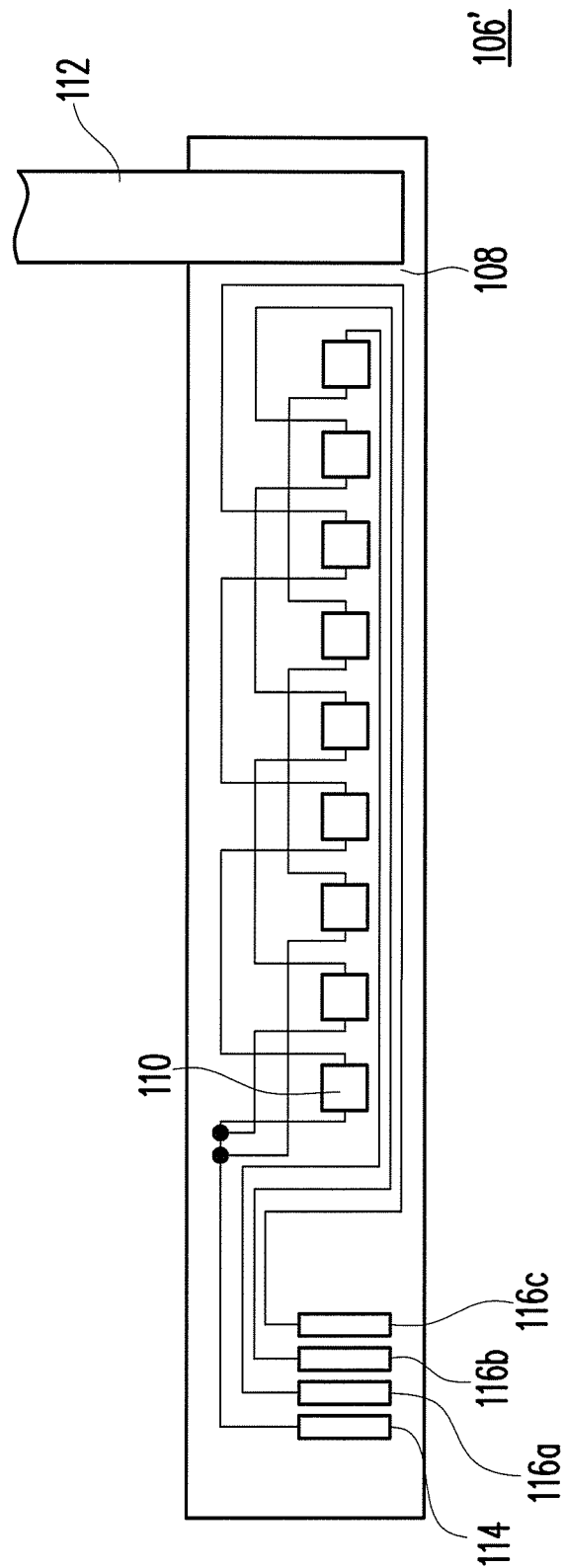
FIG. 1C illustrates the connecting relation of the LED devices via the jumpers.
Figure 2A:
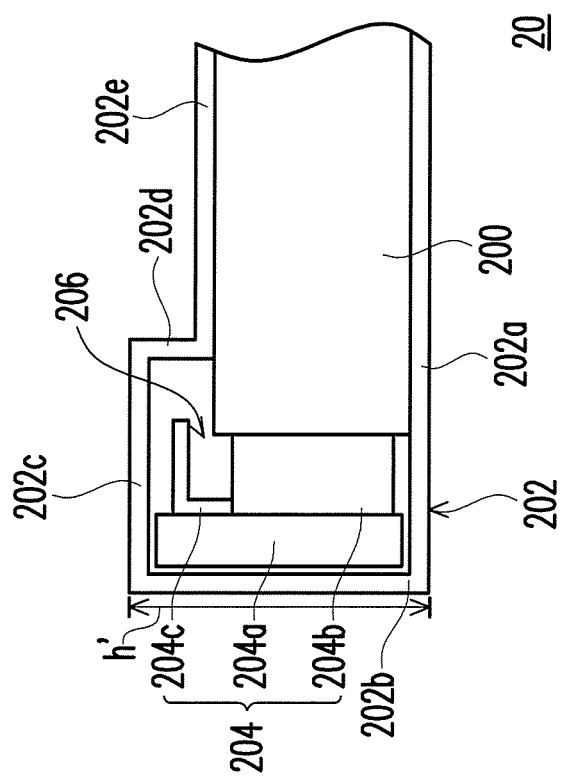
FIG. 2A is a schematic cross-sectional view illustrating a backlight module according to an embodiment of the invention.
Figure 2B:
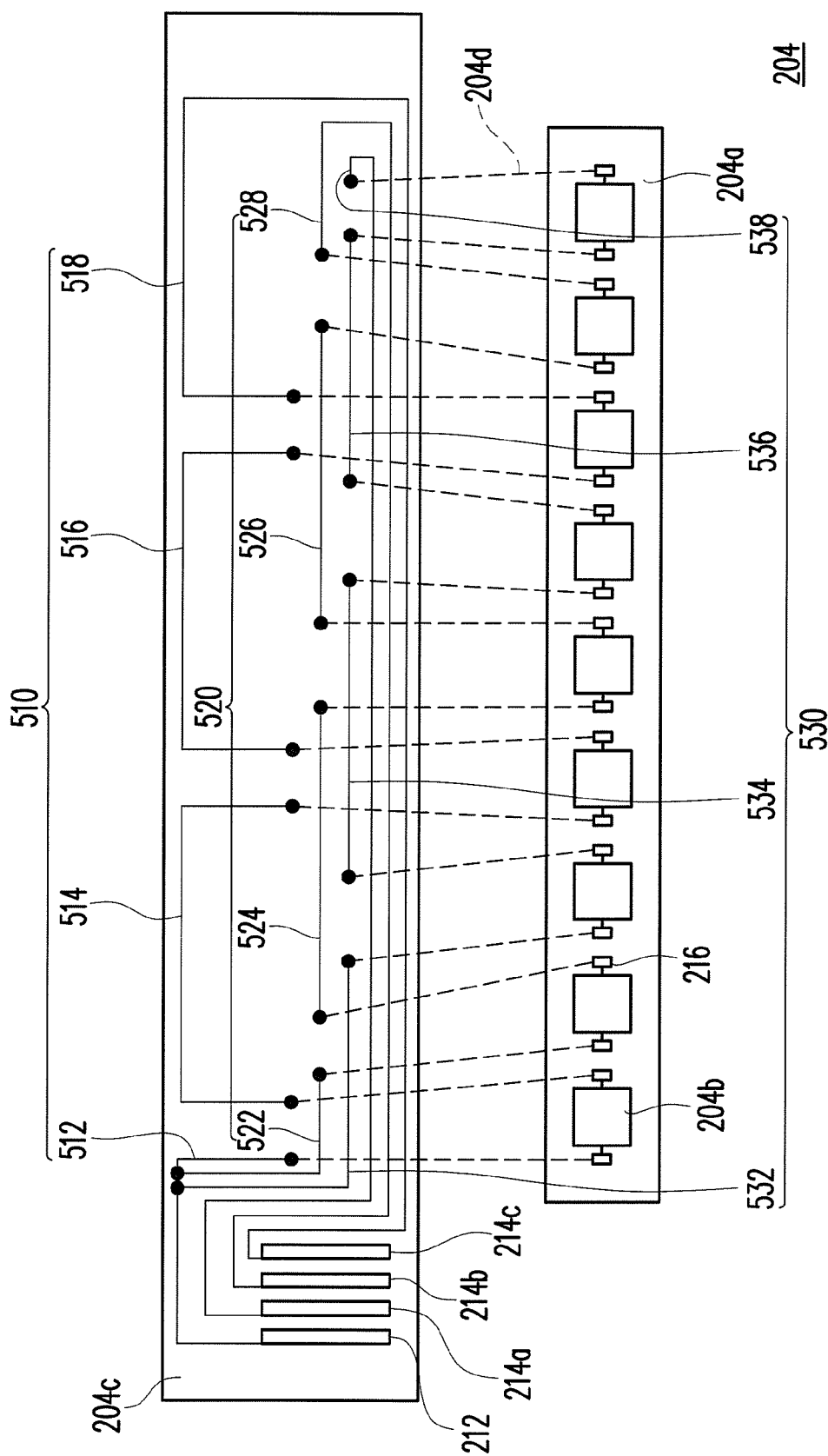
FIG. 2B is a schematic diagram illustrating circuits in the light emitting assembly depicted in FIG. 2A.
Figure 2C:
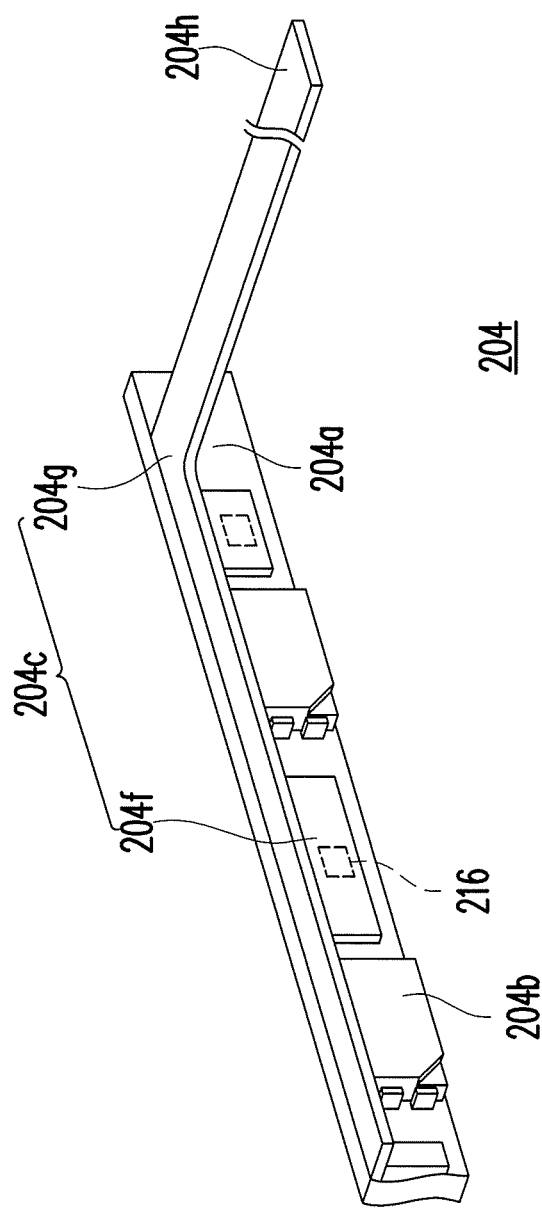
FIG. 2C is a schematic three-dimensional view illustrating the light emitting assembly depicted in FIG. 2A.

FIG. 2A is a schematic cross-sectional view illustrating a backlight module according to an embodiment of the invention. FIG. 2B illustrates the connecting relation of LED devices in the light emitting assembly depicted in FIG. 2A. FIG. 2C is a schematic three-dimensional view illustrating the light emitting assembly depicted in FIG. 2A. With reference to FIG. 2A, FIG. 2B, and FIG. 2C, a backlight module 20 includes a light guide plate 200, a holder 202, and a light emitting assembly 204. The holder 202 supports the light guide plate 200 and has a light source accommodation portion located at a side of the light guide plate 200.

Specifically, the holder 202 can include a bottom plate 202a, a side wall 202b, a top plate 202c, a wall structure 202d, and a pressing plate 202e. The side wall 202b stands at a side of the bottom plate 202a. The top plate 202c is opposite to the bottom plate 202a. Besides, the top plate 202c is connected to a side of the side wall 202b. The wall structure 202d is opposite to the side wall 202b and extends from the top plate 202c to the bottom plate 202a. The side wall 202b, the top plate 202c, the wall structure 202d, and the bottom plate 202a together constitute the light source accommodation portion. A light source accommodation space 206 is within the light source accommodation portion. The pressing plate 202e is opposite to the bottom plate 202a and extends from the wall structure 202d to a direction away from the side wall 202b. The light guide plate 200 is sandwiched between the pressing plate 202e and the bottom plate 202a.

The light emitting assembly 204 is disposed within the light source accommodation space 206. The light emitting assembly 204 includes a rigid circuit board 204a, a plurality of LED devices 204b, and a flexible circuit board 204c. The rigid circuit board 204a can be disposed on the side wall 202b. The rigid circuit board 204a has external circuits 204d isolated from one another for electrically connecting the LED devices 204b to other devices. The LED devices 204b are disposed on the rigid circuit board 204a, and each of the external circuits 204d is connected to a corresponding one of the LED devices 204b. The flexible circuit board 204c has a plurality of connecting lines 510, 520 and 530, and each of the connecting lines 510, 520 and 530 is connected to at least two of the external circuits 204d, so as to serially connect the LED devices 204b that are connected to the external circuits 204d. In this embodiment, each of the connecting lines 510, 520 and 530 respectively connects six external circuits 204d. More specifically, the connecting line 510 comprising sections 512, 514, 516 and 518 for serially connecting their corresponding external circuits 204d and LED devices 204b. Similarly, the connecting line 520 comprising sections 522, 524, 526 and 528 for serially connecting their corresponding external circuits 204d and LED devices 204b, and the connecting line 530 comprising sections 532, 534, 536 and 538 for serially connecting their corresponding external circuits 204d and LED devices 204b. Six corresponding external circuits 204d are serially connected to one another through one of the connecting lines 510, 520 and 530. Certainly, based on actual requirements, each of the connecting lines 510, 520 and 530 in other embodiments of the invention can be respectively connected to the external circuits 204d in a proper number. The flexible circuit board 204c has three connecting lines 510, 520 and 530 respectively connected to six external circuits 204d, so as to form three sets of circuits. An end of each circuit in each set is commonly connected to a positive electrode 212, while the other end of each circuit in each set is connected to negative electrodes 214a, 214b, and 214c, respectively. Since the LED devices 204b are externally connected to the flexible circuit board 204c via jumpers, v-block defects can be prevented.

On the other hand, the flexible circuit board 204c, for example, has a joint element 204h (shown in FIG. 2C) for connecting a joint element 404a (shown in FIG. 4) on a control circuit board 404 of an LCD apparatus, such that the LED devices 204b are electrically connected to the control circuit board 404. The joint element 204h is a bus line, for instance, and the joint element 404a on the control circuit board 404 is a socket, for instance.

It should be mentioned that the connecting lines 510, 520 and 530 connected to the LED devices 204b are disposed on the flexible circuit board 204c in this embodiment. Hence, when the LED devices 204b are connected via the jumpers, the area of the rigid circuit board 204a need not be enlarged, so as to effectively reduce the thickness h' of the backlight module 20.

The rigid circuit board 204a, for example, has contacts 216 corresponding to the LED devices 204b. The contacts 216 are electrically connected to the connecting lines 510, 520 and 530 of the flexible circuit board 204c, respectively. Each of the external circuits 204d connects a corresponding one of the contacts 216 and a corresponding one of the LED devices 204b. In other words, the LED devices 204b are electrically connected to the connecting lines 510, 520 and 530 of the flexible circuit board 204c through the external circuits 204d and the contacts 216. According to this embodiment, the contacts 216 and the LED devices 204b can be located at the same side of the rigid circuit board 204a. Additionally, the contacts 216 correspond to the LED devices 204b and are arranged along a length direction of the rigid circuit board 204a. The flexible circuit board 204c can include bonding portions 204f and a connecting portion 204g. As indicated in FIG. 2C, the bonding portions 204f are respectively bonded onto the contacts 216 of the rigid circuit board 204a, such that each of the connecting lines 510, 520 and 530 is electrically connected to a corresponding one of the external circuits 204d. The bonding portions 204f, through the solder, are thermally pressed onto the contacts 216 of the rigid circuit board 204a, for instance. The connecting portion 204g is arranged along a long side of the rigid circuit board 204a, so as to connect the bonding portions 204f. Besides, the connecting portion 204g extends along the top plate 202c toward a direction away from the side wall 202b. In another embodiment of the invention, the anisotropic conductive adhesive or other appropriate conductive materials can be used to bond the rigid circuit board 204a to the flexible circuit board 204c.

Note that the contacts 216 and the LED devices 204b are located at the same side of the rigid circuit board 204a in this embodiment. Based on actual requirements, the contacts 216 and the LED devices 204b can be disposed at two respective sides of the rigid circuit board 204a according to other embodiments of the invention.

Figure 3:
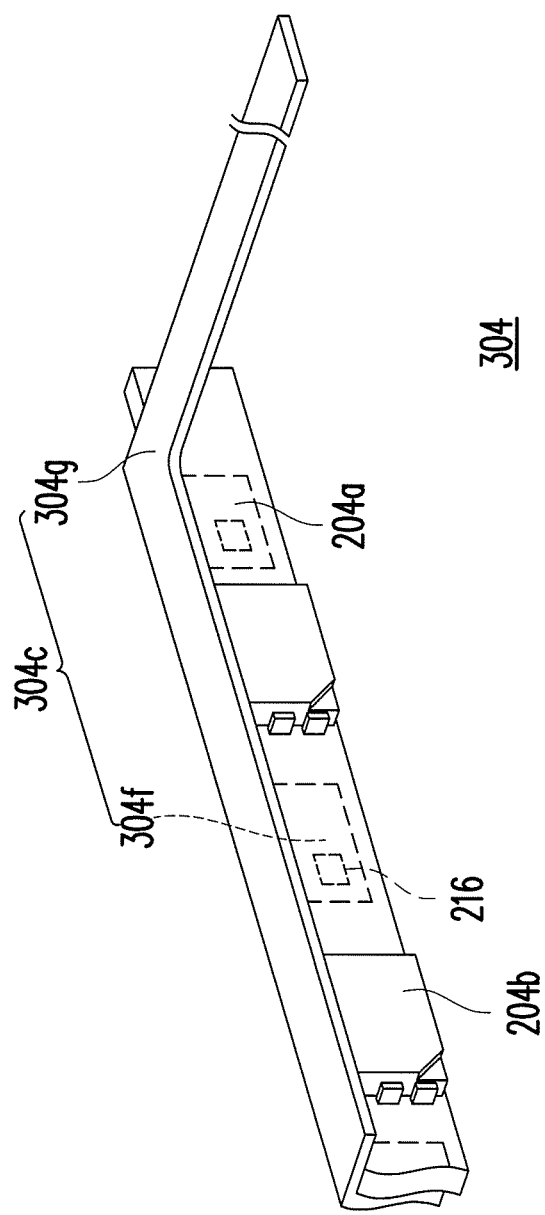
FIG. 3 is a schematic three-dimensional view illustrating a light emitting assembly according to another embodiment of the invention.

FIG. 3 is a schematic three-dimensional view illustrating a light emitting assembly according to another embodiment of the invention. With reference to FIG. 3, in a light emitting assembly 304, the contacts 216 and the LED devices 204b are disposed at two respective sides of the rigid circuit board 204a. The flexible circuit board 304c includes a bonding portion 304f and a connecting portion 304g. Similar to FIG. 2C, in FIG. 3, the bonding portion 304f, through the solder, are thermally pressed onto the contacts 216 of the rigid circuit board 204a, for instance, and the bonding portion 304f is located between the side wall 202b and the rigid circuit board 204a. The connecting portion 304g is arranged along a long side of the rigid circuit board 204a and connected to the bonding portion 304f. Besides, the connecting portion 304g extends along the top plate 202c toward a direction away from the side wall 202b.

An LCD apparatus having the backlight module with the light emitting assembly 204 is described below. In other embodiments of the invention, the backlight module having the light emitting assembly 304 is undoubtedly applicable.

Figure 4:
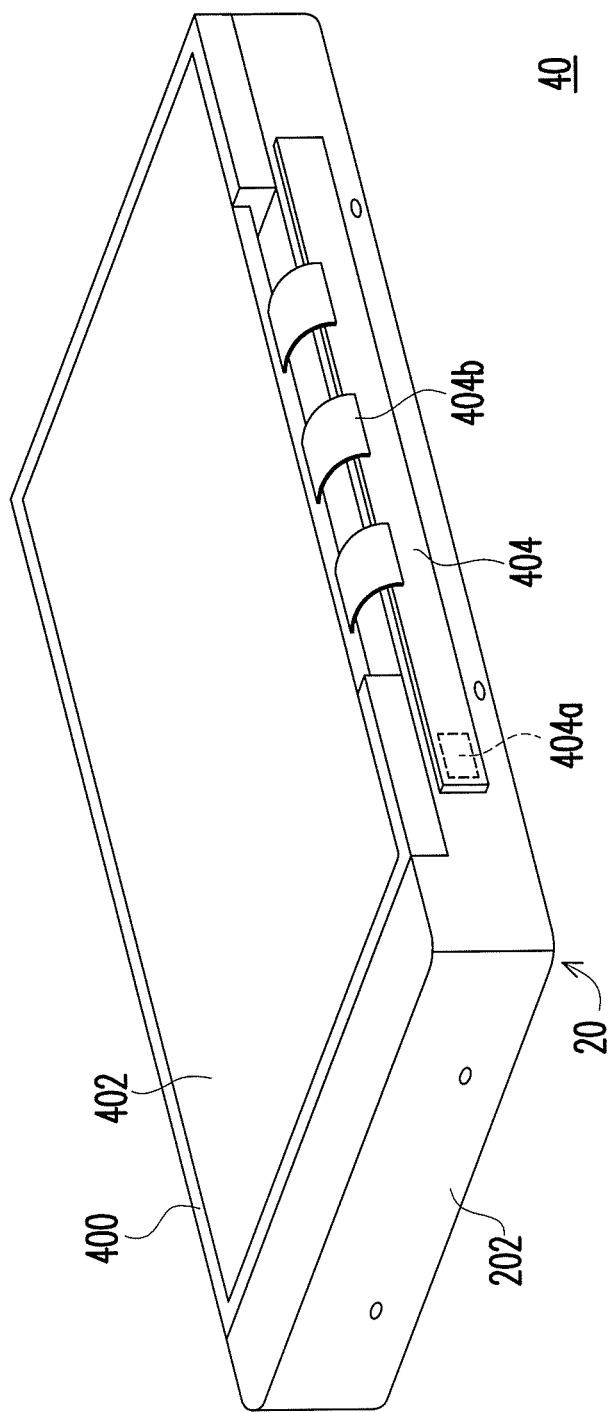
FIG. 4 is a schematic three-dimensional view illustrating an LCD apparatus according to an embodiment of the invention.

FIG. 4 is a schematic three-dimensional view illustrating an LCD apparatus according to an embodiment of the invention. With reference to FIG. 4, an LCD apparatus 40 includes the backlight module 20, a supporting frame 400, and an LCD panel 402. The supporting frame 400 is disposed on the holder 202 of the backlight module 20. The LCD panel 402 is disposed on the supporting frame 400. In addition, the LCD apparatus 40 can be electrically connected to the control circuit board 404 of the LCD panel 402 through circuits 404b. The control circuit board 404 can be disposed at a certain side of the backlight module 20 based on actual circuit arrangement, and the joint element 404a (e.g., the socket) of the control circuit board 404 can be connected to the joint element 204h (e.g., the bus line) of the flexible circuit board. Thereby, the control circuit board 404 is electrically connected to the backlight module 20.

In light of the foregoing, the LED devices in the light emitting assembly of the invention are disposed on the rigid circuit board, and the connecting lines are disposed on the flexible circuit board. Since the connecting lines are not disposed on the rigid circuit board, the area of the rigid circuit board can be reduced.

Moreover, in the backlight module having said light emitting assembly, the reduced area of the rigid circuit board effectively results in the reduced thickness of the backlight module. Thanks to said backlight module with the reduced thickness, an LCD can also have the reduced thickness when the thin backlight module is applied to the LCD.

Further, the LED devices of the rigid circuit board are externally connected to the flexible circuit board via the jumpers in this invention, and therefore the v-block defects can be prevented.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A light emitting assembly comprising:
a rigid circuit board having a plurality of first external circuits and a plurality of second external circuits isolated from one another;
a plurality of first light emitting diode devices and a plurality of second light emitting diode devices disposed on the rigid circuit board and arranged alternately with each other, each of the first external circuits being connected to a corresponding one of the first light emitting diode devices, and each of the second external circuits being connected to a corresponding one of the second light emitting diode devices; and
a flexible circuit board having a first connecting line and a second connecting line, the first external circuits of the rigid circuit board being serially connected to the first light emitting diode devices through the first connecting line of the flexible circuit board, and the second external circuits of the rigid circuit board being serially connected to the second light emitting diode devices through the second connecting line of the flexible circuit board, the flexible circuit board and the first and second light emitting diode devices are located at a same side of the rigid circuit board, and the flexible circuit board is not stacked with the first and second light emitting diode devices in a direction perpendicular to an interface between the first light emitting diode devices and the rigid circuit board and an interface between the second light emitting diode devices and the rigid circuit board.

2. The light emitting assembly as claimed in claim 1, wherein the rigid circuit board has a plurality of groups of first contacts and a plurality of groups of second contacts corresponding to the first light emitting diode devices and the second light emitting diode devices and electrically connected to the first connecting line and the second connecting line of the flexible circuit board, respectively, each of the first external circuits is connected to a corresponding one group of the first contacts and a corresponding one of the first light emitting diode devices, and each of the second external circuits is connected to a corresponding one group of the second contacts and a corresponding one of the second light emitting diode devices.

3. The light emitting assembly as claimed in claim 2, wherein the groups of first and second contacts and the first and second light emitting diode devices are located at the same side of the rigid circuit board, and the groups of first and second contacts respectively correspond to the first and second light emitting diode devices and are arranged along a length direction of the rigid circuit board.

4. The light emitting assembly as claimed in claim 2, further comprising a solder, the flexible circuit board, through the solder, being bonded onto the groups of first and second contacts of the rigid circuit board, such that each of the first and second connecting lines is electrically connected to a corresponding one of the first or second external circuits.

5. A backlight module comprising:
a light guide plate;
a holder supporting the light guide plate and having a light source accommodation portion located at a side of the light guide plate, a light source accommodation space being within the light source accommodation portion; and
a light emitting assembly disposed within the light source accommodation space and comprising:
a rigid circuit board having a plurality of first external circuits and a plurality of second external circuits isolated from one another;
a plurality of first light emitting diode devices and a plurality of second light emitting diode devices disposed on the rigid circuit board and arranged alternately with each other, each of the first external circuits being connected to a corresponding one of the first light emitting diode devices, and each of the second external circuits being connected to a corresponding one of the second light emitting diode devices; and a flexible circuit board having a first connecting line and a second connecting line, the first external circuits of the rigid circuit board being serially connected to the first light emitting diode devices through the first connecting line of the flexible circuit board, and the second external circuits of the rigid circuit board being serially connected to the second light emitting diode devices through the second connecting line of the flexible circuit board, the flexible circuit board and the first and second light emitting diode devices are located at a same side of the rigid circuit board, and the flexible circuit board is not stacked with the first and second light emitting diode devices in a direction perpendicular to an interface between the first light emitting diode devices and the rigid circuit board and an interface between the second light emitting diode devices and the rigid circuit board.

6. The backlight module as claimed in claim 5, wherein the holder comprises:

a bottom plate;

a side wall erected at a side of the bottom plate, the rigid circuit board being disposed on the side wall;

a top plate connected to a side of the side wall, the top plate being opposite to the bottom plate;

a wall structure extending from the top plate to the bottom plate, the wall structure being opposite to the side wall, and the side wall, the top plate, the wall structure, and the bottom plate together constituting the light source accommodation portion; and a pressing plate extending from the wall structure to a direction away from the side wall, the pressing plate being opposite to the bottom plate, the light guide plate being sandwiched between the pressing plate and the bottom plate.

7. The backlight module as claimed in claim 5, wherein the rigid circuit board is located between the side wall of the holder and the flexible circuit board.

8. The backlight module as claimed in claim 5, wherein the rigid circuit board has a plurality of groups of first contacts and a plurality of groups of second contacts corresponding to the first light emitting diode devices and the second light emitting diode devices and electrically connected to the first connecting line and the second connecting line of the flexible circuit board, respectively, each of the first external circuits is connected to a corresponding one group of the first contacts and a corresponding one of the first light emitting diode devices, and each of the second external circuits is connected to a corresponding one group of the second contacts and a corresponding one of the second light emitting diode devices.

9. The backlight module as claimed in claim 8, wherein the flexible circuit board comprising:

at least one bonding portion bonded onto the groups of first and second contacts of the rigid circuit board; and a connecting portion arranged along a long side of the rigid circuit board and connected to the bonding portion, the connecting portion extending along the top plate toward a direction away from the side wall.

10. The backlight module as claimed in claim 8, wherein the groups of first and second contacts and the first and second light emitting diode devices are located at the same side of the rigid circuit board, and the groups of first and second contacts respectively correspond to the first and second light emitting diode devices and are arranged along a length direction of the rigid circuit board.

11. The backlight module as claimed in claim 8, wherein the light emitting assembly further comprising a solder, the bonding portion, through the solder, being bonded onto the groups of first and second contacts of the rigid circuit board.

\* \* \* \* \*